United States Patent
Yamamoto et al.

[11] Patent Number: 6,051,893
[45] Date of Patent: Apr. 18, 2000

[54] ELECTRIC POWER SUPPLY SYSTEM FOR LOAD

[75] Inventors: Hiroshi Yamamoto; Hiroyuki Sasao; Kenichi Koyama; Yukimori Kishida; Toshimasa Maruyama; Masakazu Fukada, all of Tokyo, Japan

[73] Assignee: Mitsubishi Denki Kabushiki Kaisha, Tokyo, Japan

[21] Appl. No.: 09/181,556

[22] Filed: Oct. 29, 1998

[51] Int. Cl.[7] ................................. H02J 3/00; H02J 9/04
[52] U.S. Cl. ............................... 307/43; 307/64; 307/87
[58] Field of Search ............................ 307/64, 70, 80, 307/87, 43, 65, 42

[56] References Cited

U.S. PATENT DOCUMENTS

| | | | |
|---|---|---|---|
| 3,662,182 | 5/1972 | Ullmann et al. | 307/64 |
| 4,142,136 | 2/1979 | Witter | 318/779 |
| 4,704,652 | 11/1987 | Billigs | 361/5 |
| 4,811,163 | 3/1989 | Fletcher | 307/64 |
| 5,644,175 | 7/1997 | Galm | 307/131 |
| 5,650,901 | 7/1997 | Yamamoto | 361/8 |

OTHER PUBLICATIONS

"Static Transfer Switch: Increased Reliability & Redundancy Of Power At Critical Data Processing Centers", The CYBEREXpert, vol. 94, No. 15, 1994, pp. 1–12.

Primary Examiner—Jeffrey Gaffin
Assistant Examiner—Rios Roberto
Attorney, Agent, or Firm—Leydig, Voit & Mayer, Ltd.

[57] ABSTRACT

A fast changeover from one power system to another in the event of an irregularity in the power source system substantially reduces operating costs by minimizing a power loss in switches during conduction, dispenses with a cooling device for cooling a thyristor switch, and implements the thyristor switch in a compact and low-cost design. The power supply system for a load includes one switching apparatus for connecting a load to one power source system, and another switching apparatus for connecting the load to another power source system. Each of the switching apparatus includes a pair of thyristors connected in anti-parallel and a mechanical switch connected in parallel with the thyristor pair. The thyristor pairs and the mechanical switches are controlled so that the mechanical switches conduct a load current when the load is supplied with power from the one power source system in a steady power supply state. The thyristor switches conduct the load current during a power source changeover time within which the load is disconnected from one power source system and connected to the other power source system, and do not conduct the load current during the steady power supply state.

3 Claims, 5 Drawing Sheets

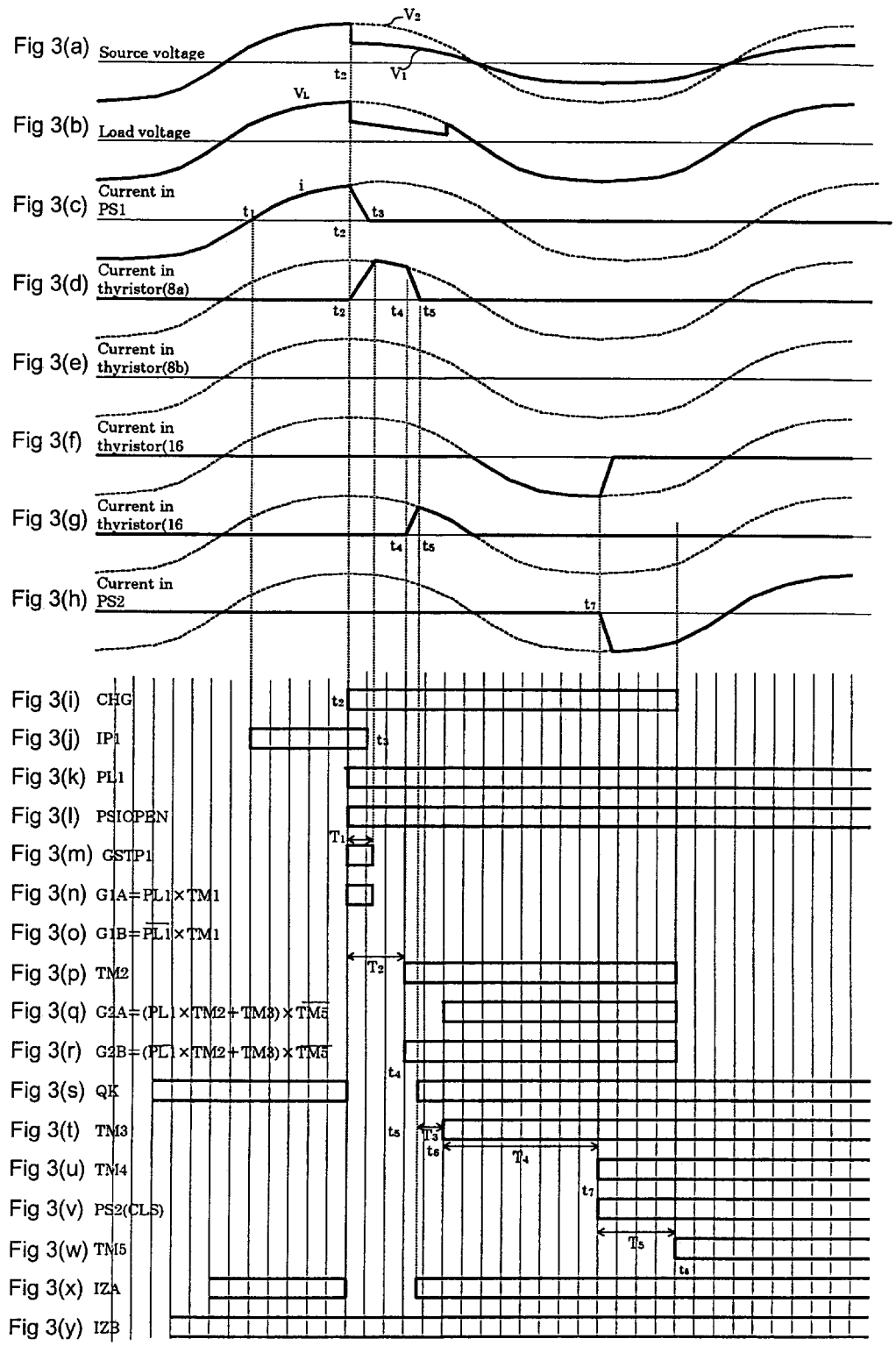

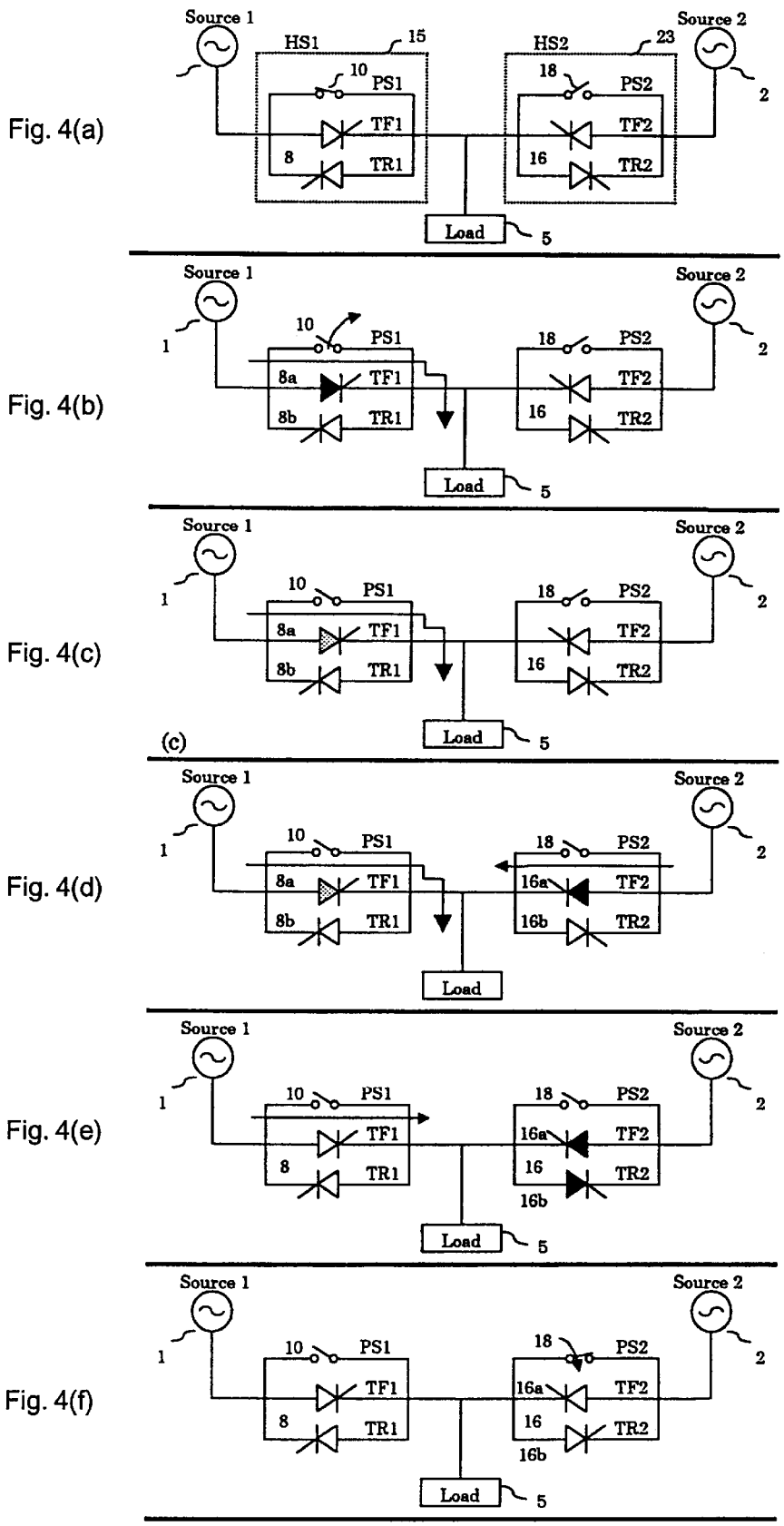

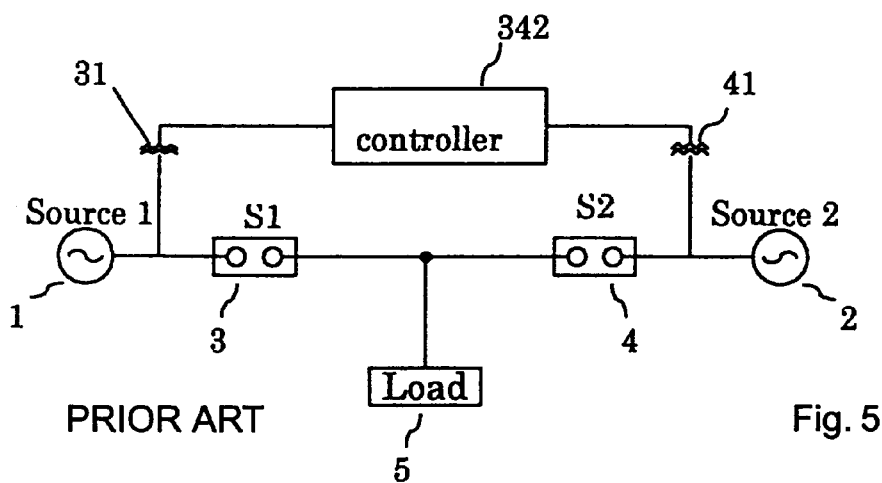
PRIOR ART    Fig. 5
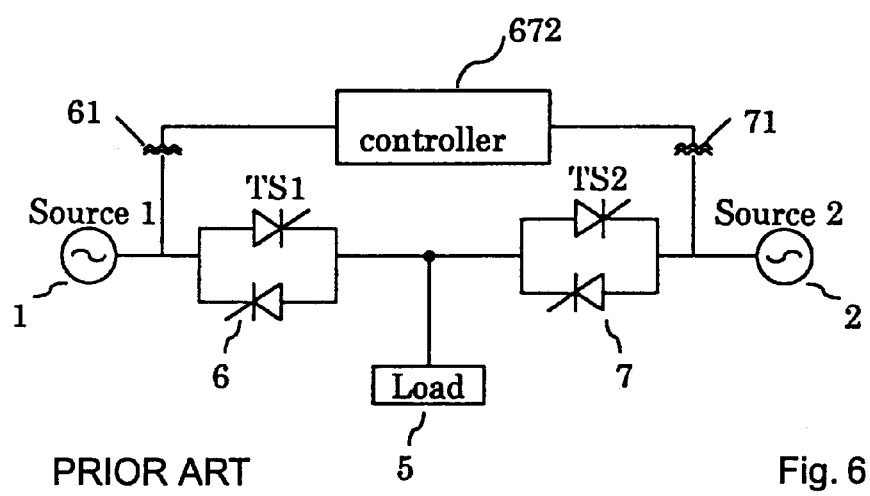
PRIOR ART    Fig. 6

ELECTRIC POWER SUPPLY SYSTEM FOR LOAD

BACKGROUND OF THE INVENTION

1. Field of the Invention

As the configuration of load devices connected to power facilities installed in factories and buildings is diversified in configuration, they become more sensitive to drops in power supply stability such as a power supply interruption and an abnormal voltage drop. However, there is an increasing need to prevent the shutdown of the load device due to drops in the power supply stability and to thereby preclude inconveniences to the community. To receive a reliable power supply, consumers of electricity adopt a two-circuit feeding system so that, for example, they can switch from one circuit to the other if one circuit fails. The present invention relates to a power supply system for a load which, in order to supply power to the load from a plurality of different alternating current power sources, selectively switches to any of the plurality of power sources to supply power to the load. More specifically, the present invention relates to an electric power supply system for a load which, in the event of an abnormality such as a voltage irregularity or an interruption of power in one power circuit, can switch the load, without any interruption, to another power circuit in normal operating conditions.

2. Description of the Related Art

FIG. 5 shows a conventional power supply system for load. Referring to FIG. 5, there are shown an alternating current power source system 1 (hereinafter referred to as a first alternating current power source system), another alternating current power source system 2 (hereinafter referred to as a second alternating current power source system), a mechanical-type switch 3 (hereinafter referred to as a first switch) for switching the first alternating current power source system 1, a voltage transformer (PT) 31 for detecting the voltage at the first alternating current power source system 1, a mechanical-type switch 4 (hereinafter referred to as a second switch) for switching the second alternating current power source system 2, another voltage transformer 41 for detecting the voltage at the second alternating current power source system 2, and a load 5, for example, a mechanical apparatus, a lighting system, an air-conditioning system, an elevator system, or a computer or a controller for controlling these systems and the like. A switch controller 342 receives the outputs of the voltage transformers 31, 32, and controls the first switch 3 and second switch 4 to selectively turn them on and off in response to the outputs of the voltage transformers 31, 32. When the second alternating current power source system 1 is in normal operating conditions, the switch controller 342 causes the first switch 2 to close while opening the second switch 3 so that power from the first alternating current power source system 1 is fed to the load 5. When a power interruption takes place in the first alternating current power source system 1, power can not be continuously supplied to the load, and the switch controller 342 causes the second switch 4 to close after opening the first switch 2 so that the second alternating current power source system 2 feeds power to the load 5 via the second switch 4. Hence, the load 5 is continuously supplied with power. Since the first switch 3 and second switch 4 are mechanical-type switches, the changeover from the first alternating current power source system 1 to the second alternating current power source system 2 takes several hundred ms or more, and during the changeover time, an interruption of power to the load is unavoidable.

The above-described power supply system or power receiving system, employing the mechanical-type switches, works with a load capable of tolerating a transient interruption of power, but when the load 5 is a computerized apparatus or equipment, which is sensitive to a transient interruption of power or an abnormal voltage drop, such a system cannot be used. When the load 5, such as a computerized apparatus or equipment, is sensitive to a transient power interruption or abnormal voltage drop, the following conventional technique is employed.

FIG. 6 shows another conventional example employing such a conventional technique, namely, a power supply switching system that includes thyristor switches instead of the mechanical-type switches to assure fast changeover speed in the changeover operation of power supply systems. Referring to FIG. 6, there are shown a first thyristor switch 6 composed of a pair of thyristors in anti-parallel connection, and a second thyristor switch 7 composed of a pair of thyristors in anti-parallel connection. When a first alternating current power source system 1 is in normal operating conditions, the thyristor pair of the first thyristor switch 6 are continuously supplied with a gate signal to keep them in a closed state and the thyristor pair of the second thyristor switch 7 are not supplied with a gate signal to keep them in an open state. Thus, the first alternating current power source system 1 thus feeds power to the load 5 via the first thyristor switch 6. When a power interruption takes place in the first alternating current power source system 1, the gate signal to the thyristor pair of the first thyristor switch 6 is immediately stopped, and the first thyristor switch 6 is opened at the moment a current flowing through the thyristor reaches zero. The thyristor pair of the second thyristor switch 7 are then supplied with a gate signal to turn them on, and a second alternating current power source system 2 feeds power to the load 5 via the second thyristor switch 7. When the thyristor switches are used, the changeover from the first alternating current power source system 1 to the second alternating current power source system 2 is completed within a ½ cycle, so that if there is a power interruption from the first alternating current power source system 1, the changeover operation to the second alternating current power source system 2 is performed without adversely affecting the load 5. In the figure, there are also shown a voltage transformer 61 for detecting the voltage at the first alternating current power source system 1, another voltage transformer 71 for detecting the voltage at the second alternating current power source system 2, and a switch controller 672 for receiving the outputs of the voltage transformers 61 and 71. The switch controller 672 controls the above-described first thyristor switch 6 and second thyristor switch 7 to selectively turn them on and off in response to the outputs of the voltage transformers 61 and 71.

As can be understood from the above discussion, in the selective power supply system or selective power receiving system, having these thyristor switches, a load current always flows through either the first thyristor switch 6 or the second thyristor switch 7. Accordingly, when a power loss attributed to an internal loss in the thyristors takes place, increased operating costs result from the generated power loss. Since the load current constantly flows through either the first thyristor switch 6 or the second thyristor switch 7, the thyristor switches 6 and 7 are subject to abnormal currents such as short-circuit currents and overload currents, and the current resistance rating of the thyristor elements forming the thyristor switch must be high enough to withstand transient abnormal currents for short periods of time.

Moreover, thyristor switch and the thyristor elements forming the thyristor switch require a large cooling system to dissipate heat generated as a result of continuously flowing load currents and transient abnormal currents, leading to a bulky and costly design.

SUMMARY OF THE INVENTION

The present invention has been developed to resolve the above problem, and it is the principal object of the present invention to enable a fast changeover from one power source system to another in the event of an irregularity in a power supply system which supplies or receives power, to minimize a generated loss in a live switch, and to substantially reduce operation costs of the power supply system.

It is another object of the present invention to dispense with a cooling device for cooling a thyristor switch.

It is yet another object of the present invention to make the thyristor switch compact and low-cost.

To achieve the above objects, the power supply system for a load of the present invention includes a switching apparatus for connecting or disconnecting a load to or from one power source system, and another switching apparatus for connecting or disconnecting the load to or from another power source system, wherein each of the switching apparatuses includes a pair of thyristors in anti-parallel connection and a mechanical-type switch connected in parallel with the thyristor pair, and wherein the thyristor pairs and the mechanical-type switches are controlled so that the mechanical-type switch for the respective power supply system conducts a load current both when the load is supplied with power from the one power source system in a steady power supply state and when the load is supplied with power from the other power source system in a steady power supply state, and so that the thyristor switches conduct the load current during a power source changeover time within which the load is disconnected from the one power source system and connected to the other power source system, and do not conduct the load current during the steady power supply state.

BRIEF DESCRIPTION OF THE DRAWINGS

FIG. 3(*a*)–FIG. 3(*y*) are waveform diagrams for each section in FIG. 2.

FIG. 4(*a*)–FIG. 4(*f*) are diagrams illustrating the changeover process from the first power source to the second power source.

FIG. 5 shows a conventional power supply switching system for a load.

FIG. 6 shows another conventional power supply switching system for a load.

DESCRIPTION OF THE PREFERRED EMBODIMENTS

Figure 1:
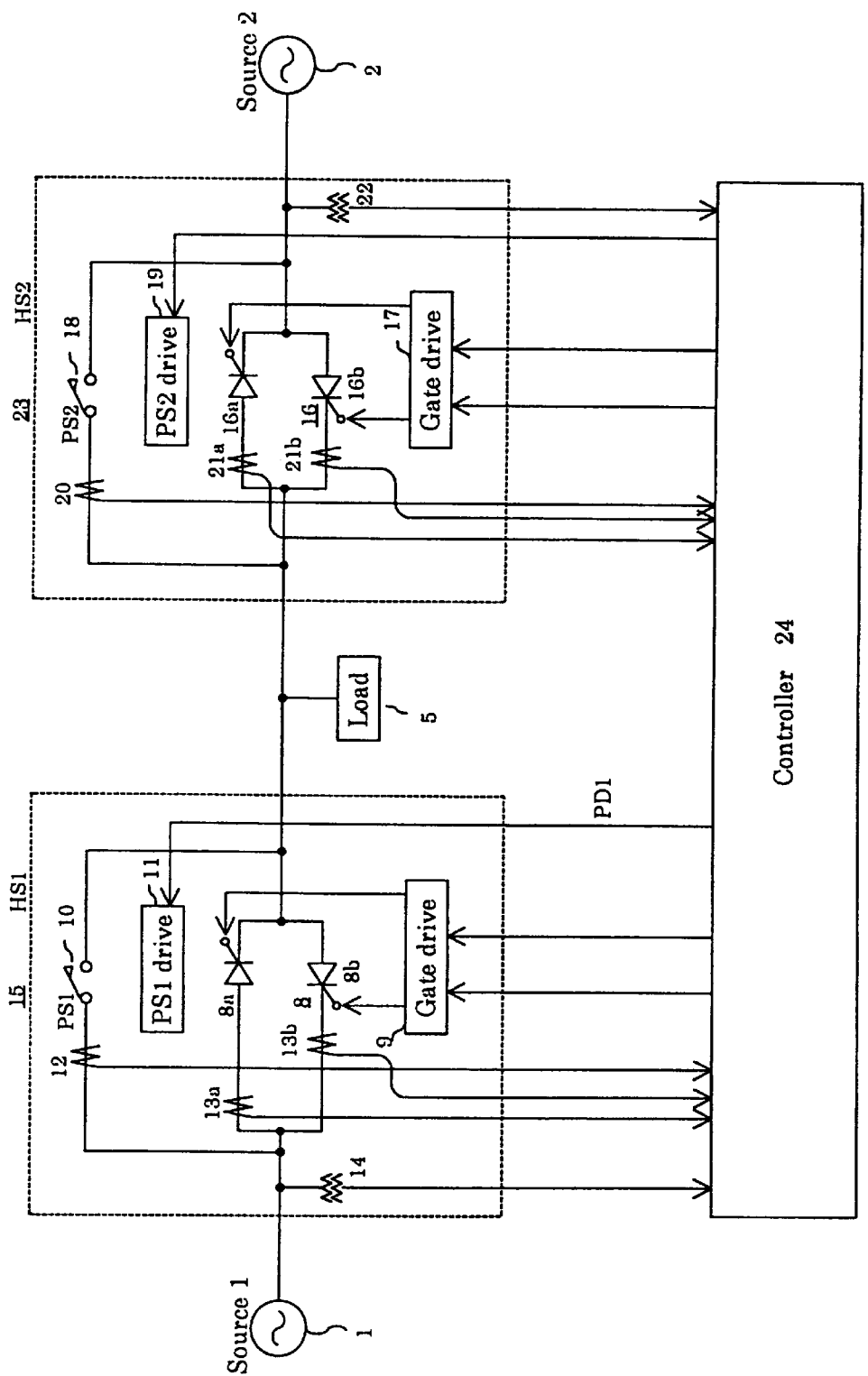
FIG. 1 is a block diagram schematically showing an entire power supply system according to an embodiment of the present invention.

Referring to the drawings, the preferred embodiments of the present invention will now be discussed.

Embodiment 1

Construction of the Embodiment

Referring to FIG. 1, a first semiconductor switch (hereinafter referred to as a first thyristor switch) 8 comprising a pair of thyristors 8*a* and 8*b* in anti-parallel connection, is connected between a first alternating current power source system 1 and a load 5. The first thyristor switch 8 is controlled so that it is conductive for only a period during which the load 5 is switched from the first alternating current power source system 1 to a second alternating current power source system 2, or for only a period during which the load 5 is switched from the second alternating current power source system 2 to the first alternating current power source system 1. A gate drive circuit 9 feeds a gate signal to the thyristors 8*a* and 8*b*. A first non-static-type bypass switch 10 is typically a mechanical quick operating vacuum switch, and is serially connected between the first alternating current power source system 1 and the load 5, and is also connected in parallel with the first thyristor switch 8. A switch drive circuit 11 drives the first bypass switch 10. A current-pickup current transformer (DT) 12 detects the current flowing through the first bypass switch 10. A current-pickup current transformer 13*a* detects the current flowing through the thyristor 8*a*. A current-pickup current transformer 13*b* detects the current flowing through the thyristor 8*b*. A voltage-pickup voltage transformer 14 detects the voltage at the first alternating current power source system 1. A first hybrid switching system or a switching apparatus 15 is composed of the first thyristor 8, gate drive circuit 9, first bypass switch 10, switch drive circuit 11, current-pickup current transformers 12, 13*a*, and 13*b*, and voltage-pickup voltage transformer 14.

A second semiconductor switch (hereinafter referred to as a second thyristor switch) 16, composed of a pair of thyristors 16*a* and 16*b* in anti-parallel connection, is connected between the second alternating current power source system 2 and the load 5. The second thyristor switch 16 is controlled so that it is conductive for only a period during which the load 5 is switched from the second alternating current power source system 2 to the first alternating current power source system 1, or for only a period during which the load 5 is switched from the first alternating current power source system 1 to the second alternating current power source system 2. A gate drive circuit 17 feeds a gate signal to the thyristors 16*a* and 16*b*. A second non-static-type bypass switch 18 is typically a mechanical quick operating vacuum switch, and is serially connected between the second alternating current power source system 2 and the load 5, and is also connected in parallel with the second thyristor switch 16. A switch drive circuit 19 drives the second bypass switch. A current-pickup current transformer 20 detects the current flowing through the second bypass switch 18. A current-pickup current transformer 21*a* detects the current flowing through the thyristor 16*a*. A current-pickup current transformer 21*b* detects the current flowing through the thyristor 16*b*. A voltage-pickup voltage transformer 22 detects the voltage at the second alternating current power source system 2. A second hybrid switching system or switching apparatus 23 is composed of the second thyristor 16, gate drive circuit 17, second bypass switch 18, switch drive circuit 19, current-pickup current transformers 20, 21*a*, and 21*b*, and voltage-pickup voltage transformer 22. A controller 24 controls the first hybrid switching system 15 and the second hybrid switching system 23.

Figure 2:
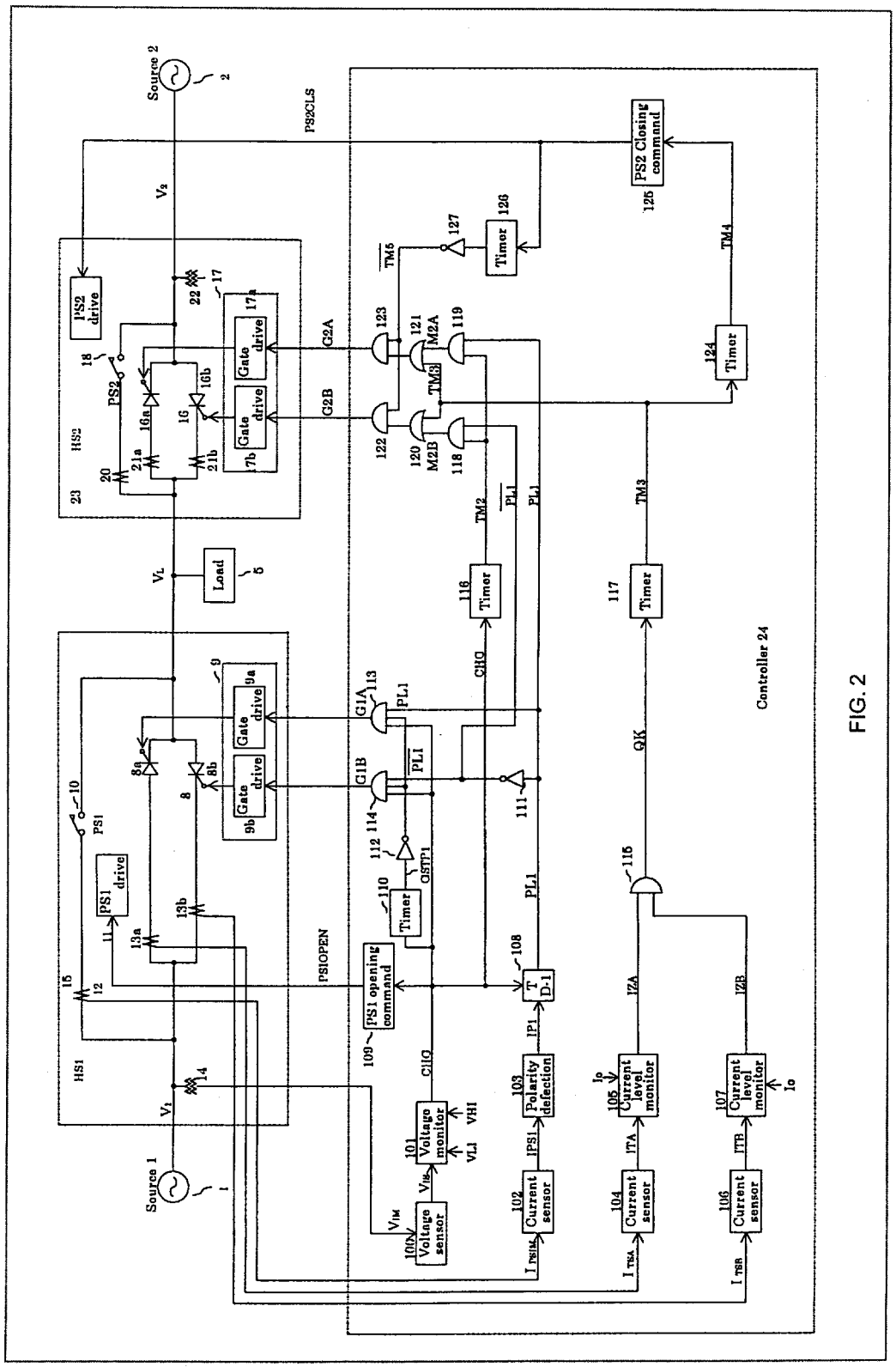
FIG. 2 is a schematic diagram showing in detail the circuit that switches from a first power source to a second power source in the controller shown in FIG. 1.

FIG. 2 shows the specific construction of the controller 24. Referring to FIG. 2, a voltage sensor 100 receives a signal $V_{1M}$ (signal corresponding to the voltage at the first alternating current power source system 1) detected by the voltage-pickup voltage transformer 14 and computes the root-mean-square value of the voltage, and outputs a signal $V_{1S}$ corresponding to the computed root-mean-square value of the voltage. A voltage monitor circuit 101 receives the output signal $V_{1S}$ of the voltage sensor 100, monitors the level of the root-mean-square value of the voltage in level, and outputs a change command signal CHG when the output $V_{1S}$ becomes out of a range defined by a predetermined voltage lower limit value $V_{L1}$ and a predetermined voltage upper limit value $V_{H1}$. Based on a signal $I_{PSM1}$ detected by the current-pickup current transformer 12 (signal corresponding to the current flowing through the first bypass switch 10), a current sensor 102 determines an instantaneous current waveform of the current flowing through the first bypass switch 10, and then outputs a determined signal $I_{PS1}$ of the instantaneous current waveform. A polarity detection circuit 103 receives the output signal $I_{PS1}$ of the current sensor 102 and determines the direction of the current flowing through the first bypass switch 10 based on the output signal $I_{PS1}$ of the current sensor 102, and provides an output signal $I_{P1}$="1" when the current flows through the first bypass switch 10 from the first alternating current power source system 1 to the load 5, and provides an output signal $I_{P1}$="0" when the current flows through the first bypass switch 10 from the load 5 to the first alternating current power source system 1. A current sensor 104 detects a current value $I_{TA}$ of a current flowing through the thyristor 8a, based on the signal $I_{TSA}$ detected by the current-pickup current transformer 13a (signal corresponding to the current flowing through the thyristor 8a). A current level monitor circuit 105 receives the output signal $I_{TA}$ of the current sensor 104, and detects whether the output signal $I_{TA}$ of the current sensor 104 is equal to or smaller than a set value $I_O$. A current sensor 106 determines a current value $I_{TB}$, based on the signal $I_{TSB}$ detected by the current-pickup current transformer 13b (signal corresponding to the current flowing through the thyristor 8b). A current level monitor circuit 107 receives the output signal $I_{TB}$ of the current sensor 106 and detects whether the output signal $I_{TB}$ of the current sensor 106 is equal to or smaller than the set value $I_O$. A memory circuit 108 is supplied with the output CHG of the voltage monitor circuit 101 and the output $I_{P1}$ of the polarity detection circuit 103, and operated to store the state of the output signal IP1 of the polarity detection circuit 103 in response to a rising edge portion of, working as a trigger, of the output CHG of the voltage monitor circuit 101 toward "1", and the memory circuit 108 thus generates an output P11. A first opening command circuit 109 receives the output CHG of the voltage monitor circuit 101, and feeds to the switch drive circuit 11 an opening command signal PS1OPEN for opening the first bypass switch 10 at the moment the output CHG of the voltage monitor circuit 101 becomes "1".

A timer circuit 110 is supplied with the output CHG of the voltage monitor circuit 101, and generates GSTP1 "1" for a predetermined duration T1 when the output CHG is at "1". A NOT gate 111 receives the output P11 of the memory circuit 108 and generates $\overline{PL1}$ "0" when P11 is "1", and generates $\overline{PL1}$ "1" when P11 is "0". A NOT gate 112 receives the output GSTP1 of the timer circuit 110 and generates an output TM1 "0" when the output GSTP1 is "1", and generates an output TM1 "1" when the output GSTP1 is "0".

An AND gate 113 receives the output CHG of the voltage monitor circuit 101, the output P11 of the memory circuit 108, and the output TM1 of the NOT gate 112. An AND gate 114 receives the output CHG of the voltage monitor circuit 101, the output TM1 of the NOT gate 112, and the output $\overline{PL1}$ of the NOT gate 111. An AND gate 115 receives the output IZA of the current level monitor circuit 105 and the output IZB of the current level monitor circuit 107.

A time delay circuit 116 receives the output CHG of the voltage monitor circuit 101 and generates an output TM2 "1" after a predetermined time T2 from when it is supplied with the signal that the output CHG has become "1".

A time delay circuit 117 receives the output QK of the AND gate 115, and generates an output TM3 "1" after a predetermined time T3 from when it is supplied with the signal that the output QK becomes "1".

An AND gate 118 generates an output M2B when it receives the output TM2 of the time delay circuit 116 and the output $\overline{PL1}$ of the NOT gate 111. An AND gate 119 generates an output M2A when it receives the output TM2 of the time delay circuit 116 and the output $\overline{PL1}$ of the memory circuit 108.

An OR gate 120 receives the output TM3 of the time delay circuit 117 and the output M2B of the AND gate 118. An OR gate 121 receives the output TM3 of the time delay circuit 117 and the output M2A of the AND gate 119.

An AND gate 122 receives the output of the OR gate 120 and an output $\overline{TMS}$ of a NOT gate 127, to be described later. An AND gate 123 receives the output of the OR gate 121 and an output $\overline{TMS}$ of the NOT gate 127, to be described later. A time delay circuit 124 receives the output TM3 of the time delay circuit 117, and generates an output TM4 "1" after a predetermined time T4 from when it is supplied with the signal that the output TM3 becomes "1". A PS2 closing command output circuit 125 receives the output TM4 of the time delay circuit 124, and generates a close command signal PS2CLS "1" for the bypass switch PS2 at the moment the output TM4 becomes "1". A time delay circuit 126 receives the output PS2CLS of the PS2 closing command output circuit 125, and generates an output TM5 "1" after a predetermined time T5 from when it is supplied with the signal that the output PS2CLS becomes "1". The NOT gate 127 receives the output TM5 of the time delay circuit 126 and generates $\overline{TMS}$ "1" in response to the output TM5 "1" and $\overline{TMS}$ "1" in response to the output TM5 "0".

FIG. 3(a)–FIG. 3(y) are waveform diagrams, in which the abscissa represents time, FIG. 3(a) plots the source voltage of the first alternating current power source system 1, FIG. 3(b) plots the load voltage of the load 5, FIG. 3(c) plots the current of the bypass switch 10 (PS1), FIG. 3(d) plots the current flowing through the thyristor (8a), FIG. 3(e) plots the current flowing through the thyristor (8b), FIG. 3(f) plots the current flowing through the thyristor (16a), FIG. 3(g) plots the current flowing through the thyristor (16b), FIG. 3(h) plots the current flowing through the bypass switch 19 (PS2), FIG. 3(i) plots the output CHG of the voltage monitor circuit 101, FIG. 3(j) plots the output $I_{P1}$ of the polarity detection circuit 103, FIG. 3(k) plots the output PL1 of the memory circuit 108, FIG. 3(l) plots the output PS1OPEN of the first opening command circuit 109, FIG. 3(m) plots the output GSTP1 of the timer circuit 110, FIG. 3(n) plots an output GIA (GIA=PL1×TM1) of the AND gate 113, FIG. 3(o) plots an output GIB (GIB=$\overline{PL1}$×TM1) of the AND gate 114, FIG. 3(p) plots the output TM2 of the time delay circuit 116, FIG. 3(q) plots an output G2A (G2A=(PL1×TM2+TM3)×$\overline{TM5}$) of the AND gate 123, FIG. 3(r) plots an output G2B (G2B=($\overline{PL1}$×TM2+TM3)×$\overline{TM5}$) of the AND gate 122, FIG. 3(s) plots the output QK of the AND gate 115, FIG. 3(t) plots the output TM3 of the time delay circuit 117, FIG. 3(u) plots the output TM4 of the time delay circuit 124, FIG. 3(v) plots the output PS2CLS of the PS2 closing command output circuit 125, FIG. 3(w) plots the output TM5 of the time delay circuit 126, FIG. 3(x) plots the output IZA of the current level monitor circuit 105, and FIG. 3(y) plots the output IZB of the current level monitor circuit 107.

Detailed Description of the Operation

Next, the operation of the embodiment 1 will be discussed. The operation of the system shown in FIG. 1 and FIG. 2 will be discussed referring to the waveform diagrams shown in FIG. 3. To clarify the operation of the present invention, the operational status at each process step is discussed referring to FIG. 4.

(1) Operation Under Normal Operating Conditions

First, referring to FIG. 4(a), operation under the normal operating conditions will be discussed.

In the first hybrid switching system 15, the first bypass switch 10 is in the closed state, and the first thyristor switch 8 is not supplied with a gate signal, and is in the open state. In the second hybrid switching system 23, the bypass switch 18 is in the open state, and the second thyristor switch 16 is not supplied with a gate signal, and is in the open state. As shown by a solid line, the first alternating current power source system 1 feeds power to the load 5 via the first bypass switch 10.

(2) Description of Changeover Operation

Next, the changeover operation from the first alternating current power source system 1 to the second alternating current power source system 2 in the event of a voltage drop in the first alternating current power source system 1 will be discussed with reference to FIG. 2, FIG. 3, and FIG. 4.

As shown in FIG. 3(a), the case of a voltage drop in the voltage V1 in the first alternating current power source system 1 at time t2 will be considered. The voltage-pickup voltage transformer 14 detects the voltage V1 in the first alternating current power source system 1, the voltage sensor 100 computes the root-mean-square value of the voltage, and the computed result V1s is input to the voltage monitor circuit 101. The voltage monitor circuit 101 compares V1s with a predetermined voltage upper limit value VH1 and a predetermined voltage lower limit value VL1, and makes the change command signal CHG "1", as shown in FIG. 3(i), when the output V1s of the voltage sensor 100 is V1s>VH1 or V1s<VL1. When the change command signal CHG becomes "1", the changeover operation from the first alternating current power source system 1 to the second alternating current power source system 2 starts and takes the following five-step sequence.

STEP 1

In STEP 1, as shown in FIG. 4(b), the first bypass switch 10 is opened and one of either the thyristor 8a or the thyristor 8b of the thyristor pair 8 is selectively fired.

This operation will now be discussed.

Referring to FIG. 2, when the change command signal CHG becomes "1", the first opening command circuit 109 is activated, outputting the open command signal PS1OPEN to the switch drive circuit 11 of the first bypass switch 10. At the moment the switch drive circuit 11 receives the open command signal PS1OPEN, the first bypass switch 10 starts its opening operation.

The current-pickup current transformer 12 detects the current flowing through the first bypass switch 10, and feeds the detected signal $I_{PS1M}$ to the current sensor 102. The current sensor 102 converts this signal into a control signal that is proportional to the current flowing through the first bypass switch 10, and feeds its output $I_{PS1}$ to the polarity detection circuit 103. The polarity detection circuit 103 outputs the output signal IP1 "1" when the current of the first bypass switch 10 is flowing from the first alternating current power source system 1 to the load 5. The polarity detection circuit 103 outputs the output signal IP1 "0" when the current of the bypass switch 10 is flowing from the load 5 to the first alternating current power source system 1. FIG. 3(c) shows the current flowing through the PS1 bypass switch 10, and since the current flows in a positive direction from time t1 to time t2, namely, from the first alternating current power source system 1 to the load 5, the output signal IP1 of the polarity detection circuit 103 is "1" during this period as shown in FIG. 3(j). As described above, when the output CHG of the voltage monitor circuit 101 becomes "1" at time t2, the rising edge of the output CHG works as a trigger, causing the memory circuit 108 to store the state of IP1 at time t2, and as shown in FIG. 3(k), the memory circuit 108 outputs the output PL1 "1".

The AND gate 113 and the AND gate 114 carry out the following logic operation.

$$G1A = PL1 \times \overline{TM1}$$
$$G1B = \overline{PL1} \times \overline{TM1} \quad (1)$$

Here, x denotes an AND operation, G1A is the output of the AND gate 113, and G1B is the output of the AND gate 114. $\overline{TM1}$ denotes the output of the NOT gate 112. PL1 is the output of the memory circuit 108, and $\overline{PL1}$ is the output of the NOT gate 111.

The output G1A serves as a drive command for the gate drive circuit 9a that fires the thyristor 8a. The output G1B serves as a drive command for the gate drive circuit 9b that fires the thyristor 8b. Specifically, by providing the outputs G1A and G1B as expressed in equation (1), one of the thyristors 8a and 8b that is directionally aligned with the current flowing through the first bypass switch 10 is selectively fired at time t2.

In the waveform shown in FIG. 3, the logic operation expressed in equation (1) gives the output G1A "1" and the output G1B "0" at time t2 as shown in FIG. 3(n) and FIG. 3(o), and the gate drive circuit 9a is driven at time t2, firing the thyristor 8a. Since, as described above, the first bypass switch 10 is supplied with the open command signal at time t2 and starts the opening operation, an arc voltage, occurring between electrode contacts of the first bypass switch 10, causes the current flowing through the first bypass switch 10 to commute to the thyristor 8a, which is fired at time t2, from time t2 to time t3 as shown in FIG. 3(c) and FIG. 3(d). At time t3, the current of the first bypass switch 10 fully commutes to the thyristor 8a, and the current flowing through the first bypass switch 10 is zero. The first bypass switch 10 fully opens its electrodes at this point, no longer permitting the flow of current, and keeps a zero current state from time t3 on.

Referring to FIG. 4(b), the current, having flown through the first bypass switch 10, commutes to the thyristor 8a, and the load 5 is supplied with the current via the thyristor 8a.

STEP 2

In STEP 2, as shown in FIG. 4(c), the gate signal to the selected thyristor 8a is suspended a predetermined time after the commuting to the first bypass switch 10 is fully completed, and the changeover operation to the second alternating current power source system 2 is carried out.

To this end, the controller 24 shown in FIG. 2 causes the timer circuit 110 to start operating at time t2, at the moment the output signal CHG of the voltage monitor circuit 101 becomes "1", and to output the gate signal stop command signal GSTP1 after a delay time T1, wherein the time T1 lasts from the start of the opening of the first bypass switch 10 to the completion of the commuting to the thyristor 8a at time t3.

The AND gate 113 and AND gate 114 give the output "0" at time t3, at the moment the gate signal stop command signal GSTP1 becomes "1", and stop the gate command signals to the gate drive circuit 9. As a result, the gate signal to the thyristor 8a is suspended.

STEP 3

In STEP 3, after a predetermined period of time that is long enough to recover sufficient insulation between the electrodes of the first bypass switch 10, subsequent to its transition to the zero current state, one of the thyristors 16a and 16b of the thyristor pair 16 is selectively fired using the logic condition determined from the thyristor 8a selected in STEP 1, and the changeover operation of the load 5 from the first alternating current power source system 1 to the second alternating current power source system 2 starts as shown in FIG. 4(d).

To this end, in the controller 24 shown in FIG. 2, the time delay circuit 116 gives the output TM2 "1" after a predetermined time delay of T2 from the moment the output CHG of the voltage monitor circuit 101 becomes "1" as shown in the waveform in FIG. 3(o). The duration T2 is set to be long enough for the first bypass switch 10 to recover sufficient insulation between its electrodes subsequent to its transition to the zero current state at time t3. After the duration T2 has elapsed, there is no problem with insulation in the first bypass switch 10 even if the thyristors 16a and 16b in the second hybrid switching system 23 are fired, and one of the thyristors 16a or 16b of the thyristor pair 16 is selectively fired at time t4.

The logic operation to select one of either the thyristor 16a or 16b is carried out by the AND gates 118 and 119 according to the following logic:

$$M2A = \overline{PL1} \times TM2$$

$$M2B = PL1 \times TM2 \quad (2)$$

where M2A is the output of the AND gate 119, M2B is the output of the AND gate 118, PL1 is the output of the memory circuit 108, $\overline{PL1}$ is the output of the NOT gate 111, x denotes an AND operation, and TM2 is the output of the time delay circuit 116.

The output M2A of the AND gate 119 is input to the AND gate 123 via the OR gate 121, and the output M2B of the AND gate 118 is input to the AND gate 122 via the OR gate 120.

The AND gate 122 and AND gate 123 perform the following logic operation on the outputs of the OR gate 120, OR gate 121 and NOT gate 127:

$$G2A = (M2A + TM3) \times \overline{TM5}$$

$$G2B = (M2B + TM3) \times \overline{TM5} \quad (3)$$

where x denotes an AND operation, + denotes an OR operation, G2A is the output of the AND gate 123, G2B is the output of the AND gate 122, M2A is the output of the AND gate 119 expressed in the above equation (2), and M2B is the output of the AND gate 118 expressed in the above equation (2). Although the operation of the time delay circuits 117 and 126 and the timing of the outputs TM3 and TM5 of the time delay circuits 117 and 126 are discussed later, here, TM3 and TM5 are TM3=0 and TM5=0 within a duration from time t4 to time t5 as shown in FIG. 3(t) and FIG. 3(u).

The output G2A of the AND gate 123 serves as a drive command for the gate drive circuit 17a that fires the thyristor 16a. The output G2B of the AND gate 122 serves as a drive command for the gate drive circuit 17b that fires the thyristor 16b. Specifically, by providing the output G2A of the AND gate 123 and the output G2B of the AND gate 122 as expressed in equation (3), the output G2B becomes "1" at time t4 as shown in FIG. 3(q) and FIG. 3(r), and the gate drive circuit 17b for the thyristor 16b is selectively driven, firing the thyristor 16b.

In the logic operation of the present invention, since the thyristor 16b selected according to equation (3) can be conducted in the direction opposite to the direction of the current flowing through the thyristor 8a, selected according to the logic operation expressed in equation (1), there is no risk of shorting the first alternating current power source system 1 and the second alternating current power source system 2, even if the thyristor 16b is fired at t4, which is when the thyristor 8a is conducting.

STEP 4

Changing to the Thyristor Pair 16

In STEP 4, a current flowing through the selectively fired first thyristor 8a is monitored, and when it is determined that the current drops below a holding current and that the first thyristor pair 8 reaches its non-conduction state, all of the gate signals to the second thyristor pair 16 are driven on, and the thyristor switches 16a and 16b are fully turned on.

Referring now to FIG. 2 and FIG. 3, this operation will be discussed.

When the thyristor 16b is fired at time t4 in STEP 3, the current flowing through the thyristor 16b works to cancel the current flowing through the thyristor 8a because the voltage V2 at the second alternating current power source system 2 is higher than the voltage V1 at the first alternating current power source system 1, as shown in FIG. 3(a), and the current flowing through the thyristor 8a starts decreasing at time t4, as shown in FIG. 3(d), and then drops down to zero at time t5. As shown in FIG. 3(g), the current flowing through the thyristor 16b, in contrast, starts increasing at time t4, and becomes equal to the load current at time t4, and the entire load current flows through the thyristor 16b thereafter.

The current flowing through the thyristor 8a is detected by the current-pickup current transformer 13a. The output signal $I_{TSA}$ detected by the current-pickup current transformer 13a is converted, by the current sensor 104, into an absolute current value signal ITA that is proportional to the magnitude of the current. The current level monitor circuit 105 determines whether the absolute current value signal ITA is lower than a predetermined level $I_o$, and when the relationship ITA<$I_0$ holds, the current level monitor circuit 105 outputs IZA="1" as a current zero determination signal. When ITA≧$I_0$, the current level monitor circuit 105 outputs IZA="0".

Similarly, the current flowing through the thyristor 8a is detected by the current-pickup current transformer 13b. The output signal $I_{TSB}$ detected by the current-pickup current transformer 13b is converted, by the current sensor 106, into an absolute current value signal ITB that is proportional to the current. The current level monitor circuit 107 determines whether the absolute current value signal ITB is lower than the predetermined level $I_0$, and when the relationship ITB<$I_0$ holds, the current level monitor circuit 107 outputs IZB="1" as a current zero determination signal. When ITB≧$I_0$, the current level monitor circuit 107 outputs IZB="0".

Referring to the waveform diagram shown in FIG. 3(d), the current flowing through the thyristor 8a drops below the predetermined value I₀ at time t5, and the output IZA of the current level monitor circuit 105 is "1" at time t5.

Referring to the waveform diagram shown in FIG. 3(*e*), the current flowing through the thyristor 8*b* is zero at time t5, and since it is lower than the predetermined value I₀, the output IZB of the current level monitor circuit 107 continuously remains at "1" as shown in FIG. 3(*y*).

The output IZA of the current level monitor circuit 105 and the output IZB of the current level monitor circuit 107 are respectively input to the AND gate 115. At time t5, both the outputs IZA and IZB become "1", causing the output QK of the AND gate 115 to change to QK="1".

The output QK of the AND gate 115 is input to the time delay circuit 117. The time delay circuit 117 monitors a duration T3 from when the thyristors 8*a* and 8*b* shift from their zero current to when the thyristors 8*a* and 8*b* completely recover their off capability, and the time delay circuit 117 makes its output TM3 "1" at time t6 after the time elapse of T3 from the moment the output QK of the AND gate 115 becomes "1" at time t5. When the output TM3 of the time delay circuit 117 becomes "1", the thyristor pair 8 are determined to be in a completely off state, and the gate signals are fed to both thyristors 16*a* and 16*b* of the thyristor pair 16 to fire them.

To this end, the time delay circuit 117 feeds its output TM3 to both the OR gate 120 and the OR gate 121, and since both the output G2A of the AND gate 123 and the output G2B of the AND gate 122 become "1" from time t6 on according to the logic operation defined by equation (3), as shown in FIG. 3(*q*) and FIG. 3(*r*), the two gate drive circuits 17*a* and 17*b* are driven to give the gate signals to the two thyristors 16*a* and 16*b*, respectively.

As a result, the thyristor switch 16 permits the second alternating current power source system 2 to feed power to the load 5.

STEP 5

In STEP 5, to eliminate loss due to the conduction of the thyristors, the bypass switch 18 is closed, as shown in FIG. 4(*f*), to cause the current to commute to the bypass switch side after a predetermined time T4 from time t6 which is when the thyristor switch 16 is fully turned on.

This operation will now be discussed.

The time delay circuit 124 makes the close command signal PS2CLS "1" at time t7 after a predetermined time T4 from time t6, as shown in FIG. 3(*v*). As a result, the bypass switch 18 is closed, causing the current that had flown through the thyristor pair 16 to commute to the bypass switch side, and the current flowing through the thyristors 16*a* and 16*b* become zero as shown in FIG. 3(*f*) and FIG. 3(*g*), and the entire load current flows through the bypass switch 18 as shown in FIG. 3(*h*).

Further, after assuring a sufficient time T5 that is long enough for the current of the thyristor pair 16 to commute to the bypass switch 18 subsequent to the transition of the bypass switch close command signal PS2CLS to "1", the gate signals to the thyristor pair 16 are suspended.

To this end, the time delay circuit 126 and NOT gate 127 are provided. The time delay circuit 126 gives the output TM5 "1" after a time elapse of T5 from the moment the bypass switch close command signal PS2CLS becomes "1". As a result, the output G2A of the AND gate 122 and the output G2B of the AND gate 123 become "0" at time t8 as expressed in equation (3), as shown in FIG. 3(*q*) and FIG. 3(*r*), and the gate signals to the thyristor pair 16 are suspended. Hence, the changeover operation is completed.

In the above control, the load voltage VL applied to the load 5 drops only during a period from time t2 to time t5, as shown in FIG. 3(*b*), and since from time t5 on the load voltage VL reverts to its normal level, no adverse effects are given to the load 5.

Embodiment 2

The embodiment 1 has been discussed in connection with the method in which the thyristor 8 is selected subsequent to the detection of the current flowing through the first bypass switch 10. In an alternative method, means for detecting a voltage across the terminals of the first bypass switch 10 is provided, and the polarity of the detected voltage is determined to selectively fire either one of the thyristors of the thyristor pair 8.

Embodiment 3

The embodiment 1 has been discussed in connection with the method in which the thyristor 8 is selected subsequent to the detection of the current flowing through the first bypass switch 10. In an alternative method, means for detecting a voltage across the terminals of each of the thyristors is provided, and the polarity of the detected voltage across each thyristor element is determined to selectively fire either one of the thyristors of the thyristor pair 8.

Embodiment 4

The embodiment 1 has been discussed in connection with the method in which the second thyristor pair 16 is fired subsequent to detecting that the current flowing through the first thyristor pair 8 drops below its holding current. In an alternative method, means for detecting a voltage across each thyristor is provided and the status of the applied voltage is determined to fire the second thyristor pair 16.

According to the present invention, as described above, the bypass switch is arranged in parallel with the thyristors, and a current is allowed to flow through the bypass switch during normal operation. During the changeover time, the commutation operation from the bypass switch to the thyristors and the changeover operation from the first thyristor switch to the second thyristor switch are performed quickly. Hence, a fast-response electric power supply system with an extremely low power loss results.

What is claimed is:

1. An electric power supply system for a load, comprising:
   a first switching apparatus connected between a first power source system and a load and
   a second switching apparatus connected between a second power source system, independent of the first power source system, and the load, the load being connected to a common connection point of said first and second switching apparatus and the power supply system performing a changeover from a state in which the first power source system feeds power through said first switching apparatus to the load, to a state in which the second power source system feeds power through said second switching apparatus to said load,
   each of said first switching apparatus and said second switching apparatus comprising
      first and second thyristors connected in anti-parallel and
      a bypass switch connected in parallel with said first and second thyristors,
   wherein said bypass switch of said first switching apparatus conducts a load current during normal operation, and, for a changeover, after current flowing through said bypass switch of said first switching apparatus is commuted to one of said thyristors of said first switching apparatus by making one of said first and second thyristors conductive, opening said bypass switch of said first switching apparatus, the load is switched to the second power source system by making said first and second thyristors of said second switching apparatus conductive, and closing said bypass switch of said second switching apparatus so that the current flowing through said first and second thyristors of said second switching apparatus is commuted to said bypass switch of said second switching apparatus, and the changeover comprises:

(a) opening said bypass switch of said first switching apparatus;

(b) detecting a current flowing through said bypass switch of said first switching apparatus and turning on said first thyristor of said first switching apparatus, based on the current detected;

(c) turning off said first thyristor of said first switching apparatus after a time duration subsequent to the opening of said bypass switch of said first switching apparatus;

(d) turning on said first thyristor of said second switching apparatus, said first thyristor of said second switching apparatus being opposite in polarity to said first thyristor of said first switching apparatus;

(e) detecting the current flowing through the first thyristor of said first switching apparatus and turning on said second thyristor of said second switching apparatus when the current flowing through said first thyristor of said first switching apparatus drops below a threshold current; and (f) turning on said bypass switch of said second switching apparatus while turning off said first and second thyristors of said second switching apparatus, subsequent to the turning on said first and second thyristors of said second switching apparatus.

2. An electric power supply system for a load, comprising:

a first switching apparatus connected between a first power source system and a load and a second switching apparatus connected between a second power source system, independent of the first power source system, and the load, the load being connected to a common connection point of said first and second switching apparatus and the power supply system performing a changeover from a state in which the first power source system feeds power through said first switching apparatus to the load, to a state in which the second power source system feeds power through said second switching apparatus to said load, each of said first switching apparatus and said second switching apparatus comprising
first and second thyristors connected in anti-parallel and
a bypass switch connected in parallel with said first and second thyristors, wherein said bypass switch of said first switching apparatus conducts a load current during normal operation, and, for a changeover, after current flowing through said bypass switch of said first switching apparatus is commuted to one of said thyristors of said first switching apparatus by making one of said first and second thyristors conductive, opening said bypass switch of said first switching apparatus, the load is switched to the second power source system by making said first and second thyristors of said second switching apparatus conductive, and closing said bypass switch of said second switching apparatus so that the current flowing through said first and second thyristors of said second switching apparatus is commuted to said bypass switch of said second switching apparatus, and means for detecting a voltage across said bypass switch of said first switching apparatus, wherein said first thyristor of said first switching apparatus to be turned on is selected depending on polarity of the voltage across said bypass switch of said first switching apparatus.

3. An electric power supply system for a load, comprising:

a first switching apparatus connected between a first power source system and a load and a second switching apparatus connected between a second power source system, independent of the first power source system, and the load, the load being connected to a common connection point of said first and second switching apparatus and the power supply system performing a changeover from a state in which the first power source system feeds power through said first switching apparatus to the load, to a state in which the second power source system feeds power through said second switching apparatus to said load, each of said first switching apparatus and said second switching apparatus comprising
first and second thyristors connected in anti-parallel and
a bypass switch connected in parallel with said first and second thyristors, wherein said bypass switch of said first switching apparatus conducts a load current during normal operation, and, for a changeover, after current flowing through said bypass switch of said first switching apparatus is commuted to one of said thyristors of said first switching apparatus by making one of said first and second thyristors conductive, opening said bypass switch of said first switching apparatus, the load is switched to the second power source system by making said first and second thyristors of said second switching apparatus conductive, and closing said bypass switch of said second switching apparatus so that the current flowing through said first and second thyristors of said second switching apparatus is commuted to said bypass switch of said second switching apparatus, and means for detecting a voltage across said first and second thyristors of said first switching apparatus, wherein said first and second thyristors of said second switching apparatus are turned on when said first and second thyristors of said first switching apparatus are supplied with a reverse voltage.

* * * * *